(12) United States Patent
Manipatruni et al.

(10) Patent No.: US 8,488,917 B2
(45) Date of Patent: Jul. 16, 2013

(54) ELECTRO-OPTIC MODULATOR

(75) Inventors: Sasikanth Manipatruni, Ithaca, NY (US); Michal Lipson, Ithaca, NY (US)

(73) Assignee: Cornell University, Ithaca, NY (US)

( * ) Notice: Subject to any disclaimer, the term of this patent is extended or adjusted under 35 U.S.C. 154(b) by 523 days.

(21) Appl. No.: 12/566,412

(22) Filed: Sep. 24, 2009

(65) Prior Publication Data

US 2010/0158426 A1 Jun. 24, 2010

Related U.S. Application Data

(60) Provisional application No. 61/099,859, filed on Sep. 24, 2008.

(51) Int. Cl.
*G02F 1/035* (2006.01)

(52) U.S. Cl.
USPC .................................................. 385/2

(58) Field of Classification Search
USPC ......................................... 385/1–3
See application file for complete search history.

(56) References Cited

U.S. PATENT DOCUMENTS

| | | | | | |
|---|---|---|---|---|---|
| 4,904,039 | A | * | 2/1990 | Soref | 385/2 |
| 6,198,853 | B1 | * | 3/2001 | Yamada | 385/2 |
| 6,320,990 | B1 | | 11/2001 | Sun | |
| 6,853,761 | B2 | * | 2/2005 | Stegmuller | 385/14 |
| 7,123,784 | B2 | | 10/2006 | Sato | |
| 7,126,169 | B2 | * | 10/2006 | Kitabatake | 257/192 |
| 7,251,408 | B1 | * | 7/2007 | Gunn et al. | 385/132 |
| 7,440,703 | B2 | | 10/2008 | Shastri et al. | |
| 7,672,553 | B2 | * | 3/2010 | Gill et al. | 385/40 |
| 7,751,654 | B2 | * | 7/2010 | Lipson et al. | 385/1 |
| 2003/0107791 | A1 | | 6/2003 | Scott | |
| 2005/0123227 | A1 | | 6/2005 | Vonsovici et al. | |
| 2009/0208214 | A1 | | 8/2009 | Hauenschild et al. | |

OTHER PUBLICATIONS

Almeida, V. R., et al., "All-Optical Control of Light on a Silicon Chip", *Nature*, 431(7012), (2004), 1081-1084.
Barrios, C. A., et al., "Electrooptic Modulation of Silicon-on-Insulator Submicrometer-Size Waveguide Devices", *Journal of Lightwave Technology*, 21(10), (Oct. 2003), 2332-2339.
Bedair, S. M., et al., "Extremely Low-Leakage GaAs P-i-N Junctions and Memory Capacitors Grown by Atomic Layer Epitaxy", *IEEE Electron Device Letters*, 11, (1990), 261-263.
Emelett, S. J., et al., "Analysis of dual-microring-resonator cross-connect switches and modulators", *Optics Express*, 13(20), (2005), 7840-7853.
Gan, F., et al., "High-speed Electrical Modulator in High-Index-Contrast (HIC) Si-Waveguides", *Conference on Lasers and Electro-Optics*, 2005. (CLEO), vol. 1, (2005), 104-106.
Gunn, C., "CMOS Photonics™—SOI Learns a New Trick", *Proceedings, 2005 IEEE International SOI Conference*, (2005), 7-13.
Hewitt, P. D., et al., "Improved Modulation Performance of a Silicon p-i-n Device by Trench Isolation", *Journal of Lightwave Technology*, 19(3), (Mar. 2001), 387-390.

(Continued)

*Primary Examiner* — Uyen Chau N Le
*Assistant Examiner* — John M Bedtelyon
(74) *Attorney, Agent, or Firm* — Perkins Coie LLP

(57) ABSTRACT

A doping profile for a modulator facilitates rapidly changing the carrier density in a waveguide. The carrier density change causes rapid changes in the index of refraction of the waveguide. Example modulators include a ring modulator and a Mach Zender modulator. A charge reciprocating section may be provided to control the amount of injected charge.

22 Claims, 4 Drawing Sheets

OTHER PUBLICATIONS

Huang, H. C., et al., "Quantum calculations of the change of refractive index due to free carriers in silicon with nonparabolic band structure", *Journal of Applied Physics*, 67, (1990), 2033-2039.

Jalali, B., et al., "Scaling laws of nonlinear silcon nanophotonics", *Optoelectronic Integration on Silicon II, Proceedings of the SPIE*, vol. 5730, (2005), 41-51.

Kimerling, L. C., et al., "Electronic-photonic integrated circuits on the CMOS platform", *Proceedings of SPIE—Silicon Photonics*, vol. 6125, (2006), 612502.1-612502.10.

Kuwayama, T., et al., "Interface recombination velocity of silicon-on-insulator wafers measured by microwave reflectance photoconductivity decay method with electric field", *Applied Physics Letters*, 83(5), (2003), 928-930.

Liao, L., et al., "High Speed Silicon Mach-Zehnder Modulator", *Optics Express*, 13(8), (2005), 3129-3135.

Little, B. E., et al., "Microring Resonator Channel Dropping Filters", *Journal of Lightwave Technology*, 15(6), (1997), 998-1005.

Little, B. E., et al., "Ultra-Compact Si-SiO$_2$ Microring Resonator Optical Channel Dropping Filters", *IEEE Photonics Technology Letters*, 18(4), (Apr. 1998), 549-551.

Liu, A., et al., "A high-speed silicon optical modulator based on a metal-oxide-semiconductor capacitor", *Nature*, 427(6975), (Feb. 12, 2004), 615-618.

Liu, A., et al., "High-speed optical modulation based on carrier depletion in a silicon waveguide", *Optics Express*, 15(2), (2007), 660-668.

Lutz, H. W., et al., "High-field electron transport in GaAs/Al$_{1-x}$Ga$_{1-x}$As p-i-n-i-p-structures investigated by ultrafast absorption changes", *Physica E: Low-dimensional Systems and Nanostructures*, 13(2-4), (2002), 802-805.

Manipatruni, S., et al., "PINIP based high-speed high-extinction ratio micron-size silicon electro-optic modulator", *Optics Express*, 15(20), (2007), 13035-13042.

Palais, O., et al., "Contactless measurement of bulk lifetime and surface recombination velocity in silicon wafers", *Journal of Applied Physics*, 93, (2003), 4686-4690.

Schmidt, B., et al., "Compact electro-optic modulator on silicon-on-insulator substrates using cavities with ultra-small modal volumes", *Optics Express*, 15(6), (2007), 3140-3148.

Soref, R. A., et al., "Electrooptical Effects in Silicon", *IEEE Journal of Quantum Electronics*, vol. QE-23(1), (Jan. 1987), 123-129.

Woodward, T. K., et al., "Modulator-Driver Circuits for Optoelectronic VLSI", *IEEE Photonics Technology Letters*, 9(6), (1997), 839-841.

Xu, Q., et al., "12.5 Gbit/s carrier-injection-based silicon micro-ring silicon modulators", *Optics Express*, 15(2), 2007, 430-436.

Xu, Q., et al., "Cascaded silicon micro-ring modulators for WDM optical interconnection", *Optics Express*, 14(20), (2006), 9430-9435.

Xu, Q., et al., "Micrometre-Scale Silicon Electro-Optic Modulator", *Nature*, 435(7040), (2005), 325-327.

Yamada, K., et al., "Electroabsorption modulator with PINIP structure", *Electronic Letters*, 34, (1998), 304-306.

Yariv, A., "Universal Relations for Coupling of Optical Power Between Microresonators and Dielectric Waveguides", *Electronics Letters*, 36(4), (2000), 321-322.

Zheng, D. W., et al., "Improved efficiency Si-phontonic attenuator", *Optics Express*, 16(21), (2008), 16754-16765.

Zhou, L., et al., "Silicon electro-optic modulators using p-i-n diodes embedded 10-micron-diameter microdisk resonators", *Optics Express*, 14(15), (2006), 6851-6857.

\* cited by examiner

ELECTRO-OPTIC MODULATOR

RELATED APPLICATION

This application claims priority to U.S. Provisional Application Ser. No. 61/099,859 (entitled: PINIP Electrooptic Modulator in Silicon Operating At the Optical Phonon Limited Speeds, filed Sep. 24, 2008) which is incorporated herein by reference.

GOVERNMENT FUNDING

This invention was made with Government support under Grant Number 0300387 awarded by the National Science Foundation and under Grant Number W911NF-06-1-0057 awarded by the U.S. Army Department of Defense. The United States Government has certain rights in the invention.

BACKGROUND

An all-silicon electro-optic modulator is a key component in electronic photonic integrated circuits. Carrier dispersion based electro-optic modulators on Silicon-On-Insulator substrates have been demonstrated based on a MOS capacitor, a PIN diode or a PN junction. However, in order to achieve high performance devices with high extinction ratio for high data rate on small silicon foot print, one needs to break the traditional tradeoff between speed and extinction ratio. MOS based devices can potentially scale in speed to many tens of Gbits/s; however the effective index change obtained is limited due to small overlap of the optical mode with carrier concentration change. On the other hand PIN based devices with laterally formed junctions provide high extinction ratio but are limited in speed due to the carrier injection dynamics. Hence a tradeoff exists between speed and extinction ratio due to the available electrooptic structures. The present invention is a device which achieves both high-speed and high-extinction ratio through a novel doping profile.

SUMMARY

An electro-optic modulator back-to-back diodes structure facilitates rapidly changing the carrier density in a photonic structure to rapidly change the index of refraction of the photonic structure. A ring modulator or a Mach-Zehnder modulator may be used as the photonic structure. A charge reciprocating section may also be used to allow for controlling amount of injected charge.

DETAILED DESCRIPTION

In the following description, reference is made to the accompanying drawings that form a part hereof, and in which is shown by way of illustration specific embodiments which may be practiced. These embodiments are described in detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

An optical modulator achieves both high speed and high extinction ratio through a novel doping profile. Various embodiments of the modulator include two back-to-back diodes formed by laterally doped layers of p-i-n-i-p. The electrical rise and fall times in one embodiment are 10 ps and 15 ps respectively which approach a fundamental limit imposed by carrier terminal velocity in silicon for a photonic structure such as waveguide geometries dictated by index contrast in silicon on insulator (SOI) substrates. Based on such a structure, an electro-optic modulator may be formed that operates at 40 Gbit/s non-return to zero (NRZ) with a high extinction ratio (>10 dB) within the dimensions of ~10 microns.

Figure 1A:
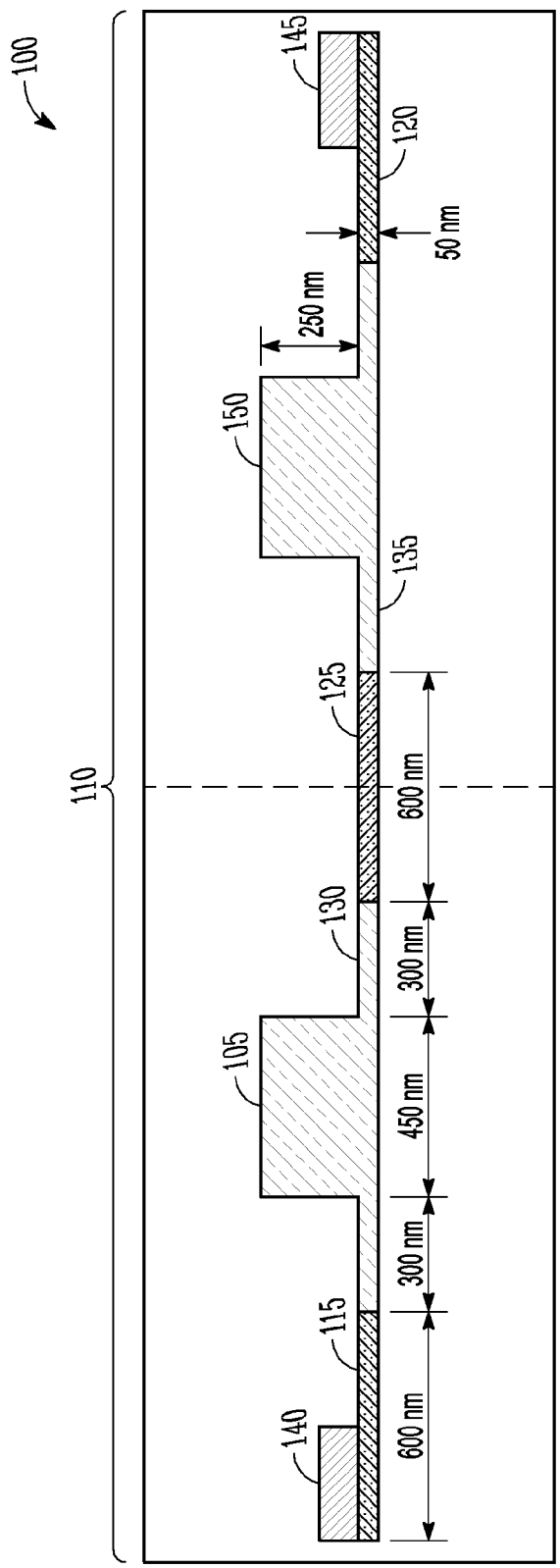
FIG. 1A is a cross section representation of an optical modulator according to an example embodiment.

FIG. 1A is a cross section representation an optical modulator 100 that includes a photonic structure such as a waveguide 105 embedded in a PINIP device 110 in the shape of a ridge. The PINIP device 110 in one embodiment is formed of a two P doped silicon regions 115, 120 that are separated from an N doped area 125 by intrinsic regions 130, 135. P doped region 115 may be coupled to a contact region 140, and P doped region 120 may be coupled to a contact region 145. In some embodiments, the PINIP device 110 is formed as a relatively thin slab on SOI, whereas the waveguide 105 is substantially thicker. A charge reciprocating area or ridge 150 may be formed on intrinsic region 135. The PINIP device 110 provides high speed transitions of carrier density in the waveguide. The refractive index of the waveguide is modulated due to the carrier dispersion effect in silicon. The doping levels and dimensions of one example device are outlined in Table 1. The concentrations shown in Table 1 are example concentrations only, and may be varied over a wide range of concentrations to optimize performance for various size and configuration modulators.

TABLE 1

| PINIP Device Parameters | |
|---|---|
| Intrinsic region doping | $5 \times 10^{16}/cm^3$ |
| N region doping | $10^{19}/cm^3$ |
| P region doping | $10^{19}/cm^3$ |
| N region width | 600 nm |
| Waveguide dimensions (width × height) | 450 nm × 250 nm |
| Distance from waveguide edge to doped regions | 300 nm |

Figure 1B:
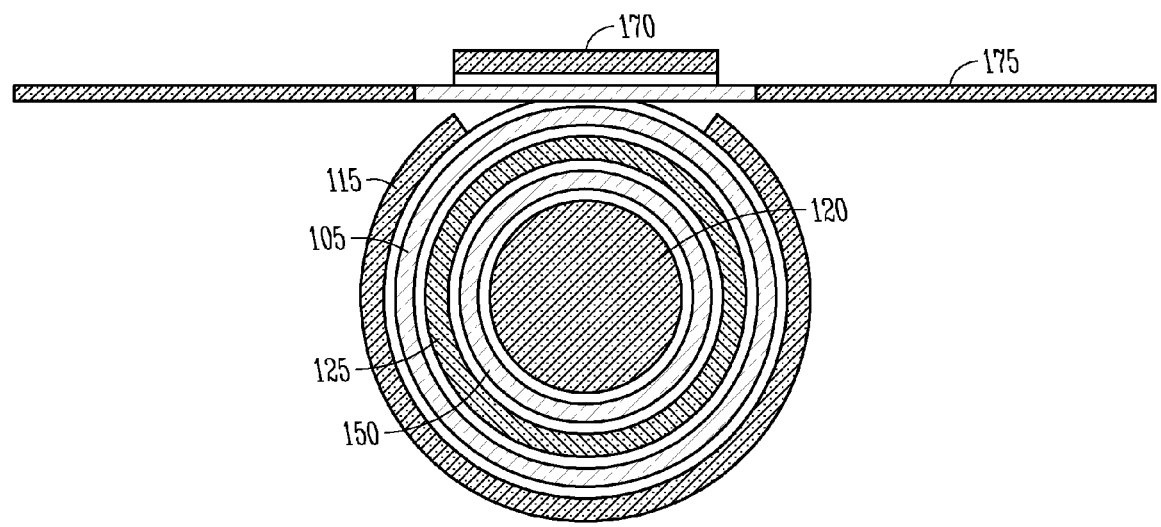
FIG. 1B is a top view of an optical modulator integrated with a ring resonator according to an example embodiment.

In one embodiment, the PINIP device may be formed as a ring resonator, as illustrated a top view in FIG. 1B. The PINIP structure is integrated into a silicon ring cavity on an SOI platform in one embodiment. Note that only the outer ring, waveguide 105 supports an optical mode while the inner ring, ridge 150 is used only as part of the electrical PINIP structure.

The PINIP device 110 operates as a high field transport device where carriers are accelerated through the intrinsic region at the saturation velocity in silicon. This structure may be used for study of high field behavior of electrons (NIPIN) and holes (PINIP). The high field, near saturation velocity transport in PINIP may be used for electro-optic modulation in an SOI photonic device. As discussed above, waveguide 105, which is in the shape of a ridge, is used for guiding light, while ridge 150 is used as a charge reciprocating structure. The double ridge structure creates symmetry in the electrical response of the PINIP device. The charge injecting regions are connected to a strip waveguide 170 through a 50 nm thick slab of intrinsic silicon 175. The entire structure may be clad in $SiO_2$.

The charge injecting regions in one embodiment have uniform doping concentrations of $10^{19}/cm^3$. The wave guiding regions may be slightly p doped with a typical dopant concentration of $5 \times 10^{16}/cm^3$ so that the carrier density changes are unipolar. This significantly decouples the performance of the device from the time response of recombination of electrons and holes. Such decoupling is useful to avoid pattern dependency and timing jitter associated with carrier dispersion devices due to recombination effects.

An example modulator formed in accordance with modulator 100 may exhibit a carrier injection time of 10 ps and extraction time of 15 ps enabling ~100 GHz operation of a silicon electro-optic device. These times allow the device to operate at optical phonon limited speeds (carrier velocity of $10^7$ cm/s) in a silicon electro-optic device. Such a device may be integrated with a microring resonator or a Mach-Zehnder interferometer to form an electro-optic modulator. Such modulators may operate at 40 Gbit/s with 12 dB extinction ratio and 2.25 fJ/bit/micron-length power dissipation. In some embodiments, the modulator may be used as a part of a wavelength division multiplexing scheme to increase the number of optical wavelengths in use to >25. This would allow modulations of greater than one Tera bit/second optical data streams. Such modulators may overcome the hold time restriction of PIN devices. A data ON state can be held for hundreds of nanoseconds enabling usage of telecom quality data with long sequences of ones and zeros. Such modulators may provide an extra level of optical design flexibility where double ring optical response can be tuned to increase the dispersion tolerance for long distance communications.

The modulator 100 has a free carrier dispersion of silicon that may be modeled by the following equations for the refractive index and absorption coefficient for a wavelength of 1.55 μm in silicon.

$$\Delta n = \Delta n_e + \Delta n_h = -(8.8 \times 10^{-22} \Delta n + 8.5 \times 10^{-18} (\Delta p)^{0.8})$$

$$\Delta \alpha = \Delta \alpha_e + \Delta \alpha_h = 8.5 \times 10^{-18} \Delta n + 6.0 \times 10^{-18} \Delta p$$

where Δn is the change in refractive index, Δα is the change in absorption coefficient of intensity, ΔN is the injected electron density per $cm^3$, and ΔP is the injected hole density per $cm^3$ The deviation from the classical Drude model is included in the 0.8 power dependency on the hole concentration which arises due to the non-parabolic shape of the band structure of silicon.

In one embodiment, PINIP device 110 consists of two adjacent diodes arranged in opposite directions and sharing the N doped region. It is symmetrical about the N doped region in one embodiment. Charge transport takes place during the turn-on and turn-off times of the diodes resulting in fast carrier density changes. The turn-on and turn-off times of the diodes may be determined by the time taken for the carriers to form the depletion region as they are swept under high electric fields. The carriers are accelerated to the carrier terminal velocity in silicon ($10^7$ cm/s) under electric fields exceeding $10^4$ V/cm. By using a symmetric electrical structure for the diodes, fast transients are produced during the build up of and depletion of carriers.

Simulated electrical transient characteristics show that the PINIP device conducts only during the transition time of the applied voltage thus creating fast electrical transitions. Asymmetry in the rise and fall times is believed due to a non-uniform distribution of the electric field in the intrinsic region. The rise time is determined by the transit time of carriers from the thin slab region to the center of the waveguide region. The electric field in the slab region is higher than the electric field in the waveguide region, leading to a faster rise time (10 ps) as compared to the fall time. The rise time of this device is 2 orders of magnitude smaller than the rise time in PIN carrier injection devices which is on the order of 1 ns (determined by the free carrier lifetime). The device also shows reduced dependence of peak carrier density on the applied voltage. This reduces the effect of noise in the applied voltage on the output waveforms.

The dual-diode PINIP device provides a way to control injected charge while enabling high speed transitions. When a positive voltage is applied, the injection of carriers is believed to stop as soon as the second diode goes into reverse bias. As a consequence, the injected charge is limited to the charge required to reverse-bias the second diode. The injected charge is clamped to the intrinsic hole concentration (which is identical in both diodes). Similarly, when a negative voltage is applied, the first PIN region will be reverse-biased and the charge injected into the second PIN region is controlled by the first PIN region. The peak charge concentration may be controlled by the amount of charge that can be exchanged between the forward and reverse diodes.

Figure 2:
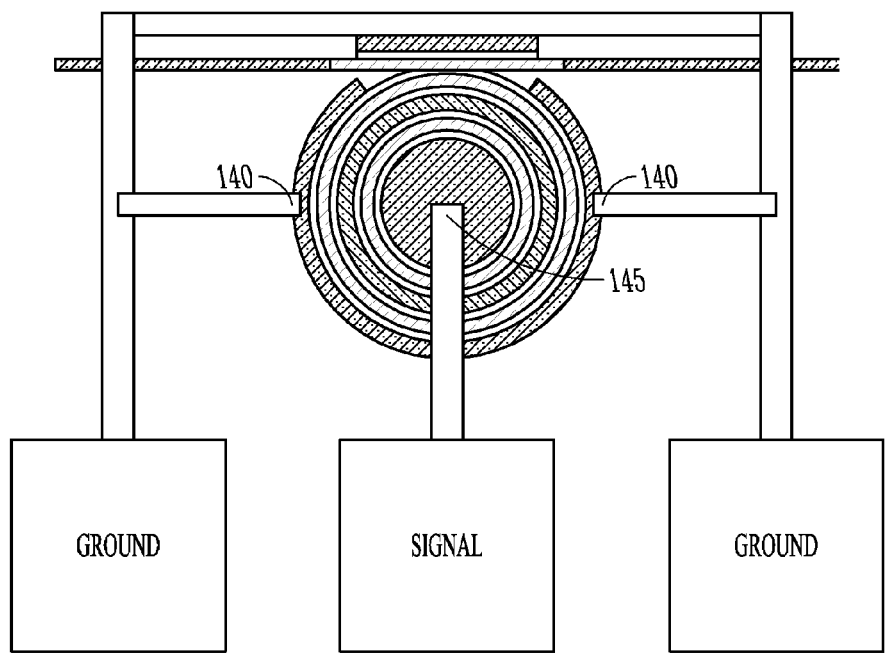
FIG. 2 is a top view of the optical modulator of FIG. 1B with contacts for providing a modulation signal according to an example embodiment.

FIG. 2 illustrates a top view of connections for providing electrical signals to a PINIP optical ring modulator 100. A signal is provided by contact 145 to region 120, while region 115 has contacts 140. This arrangement of contacts may be used to test the device, while other contact arrangements may also be used to provide suitable electrical connections to the PINIP diodes for modulating light. Such connections may be formed using common processing steps used to form silicon based integrated circuitry.

The transient optical response of the PINIP double-ridge ring modulator may be compared with the optical response of a PIN embedded ring modulator. Both the devices were assumed to be fabricated using waveguides with a 1 ns carrier life time (total surface recombination velocity of 16,000 cm/s due to surface recombination and interface recombination). The ring resonator may be modeled as a ring cavity with a lossless coupler as an input. The ring cavity may be simulated by iteratively calculating the fields in the ring and the coupler. In response to a symmetric square pulse of ±2.5 V for modulators with a quality factor of 20,000 in a single PIN modulator one can observe the effect of storage time due to accumulated carriers. In a PINIP modulator this effect is not present. A chirp-like transient at the rising edge of optical transmission may occur and improves the eye opening and is caused by the interference between optical energy being released from the cavity and the input optical energy. The optical fall time of the PINIP modulator is given by the photon lifetime of the cavity. The turn-off time is determined by the optical ring-down time of the cavity given by the photon lifetime ($\lambda^2/2\pi c \Delta \lambda = 16$ ps) for a cavity with a quality factor of 20,000).

Since the device is unipolar, the effect of the carrier recombination on the device performance is small in the absence of the oppositely charged carriers. Note that even though the surface states at the oxide/silicon interface act as traps for the carriers they do not lead to recombination. This is in strong contrast to PIN-based device performance which strongly depends on the recombination lifetime. The transmission of both PIN and PINIP devices for surface recombination velocities (SRVs) of 100 cm/s to 20,000 cm/s reveals a strong performance dependence of the PIN device on the SRV in strong contrast to the performance of PINIP devices which shows no SRV dependence.

The PINIP devices can modulate data with extremely long identical bit sequences since the state hold time is >1 µs in the absence of carrier recombination processes. The state hold time is limited by the leakage current of the structure which mainly arises from thermal generation in the depletion region. The PINIP devices also do not suffer from the timing jitter that is characteristic of PIN-based carrier injection modulators.

A simulation of the structure showed electro-optic modulation at 40 Gbit/s in an non return to zero (NRZ) modulation scheme with a resonator of quality factor 5,000. A relatively low quality factor resonator is used since in the absence of electrical fall time limitations, the speed of modulation is now given only by the cavity ring-down time. Some embodiments extend the speed of carrier injection modulators from a few Gb/s to as high as 40 Gb/s. In some embodiments, an applied voltage and corresponding optical transmission profile for an arbitrary bit sequence modulated with an extinction ratio (defined as $10\log_{10}(P_{high}/P_{low})$) of 12 dB at 40 Gbit/s, and an assumed a loss of 8 dB/cm in the ring under critical coupling conditions result in an insertion loss of 3 dB at 40 Gbit/s with a peak injection of $5 \times 10^{16}$ cm$^{-3}$. The insertion loss and extinction ratio can be improved by optimizing the doping profiles or by designing a filter shape using multiple rings or a single add-drop ring filter.

In one embodiment, a maximum sequence of ones (logic high bits) that a modulator such as modulator 100 can modulate is greater than 1000 bits. The length of identical bit sequence is limited only by the storage time of carriers determined by the leakage current of the device making this an ideal component for on-chip modulation for intra chip communication. The estimated power dissipation of the device is 2.25 fJ/bit/micron length. The energy per bit is estimated from the total charge injected per bit per micron length of the waveguide (0.9 fC/bit/micron) multiplied by the switching voltage (5 V) and the bit transition probability (0.5). The modulator does not draw current while the state is being held except for the parasitic leakage current. This is in contrast to PIN devices where the recombination of carriers has to be compensated with a steady state current inversely proportional to the carrier lifetime. The compact size also avoids the need for traveling wave electrodes and reduces the drive current requirements. The modulator can be driven by an analog CMOS driving circuit made on the same SOI substrate.

In various embodiments, a high speed silicon electro-optic device may increase the modulation rate beyond 40 Gbit/s, and may be limited only by the photon lifetime of the cavity. The device shows electrical transitions of 10 ps which is close to the fundamental limit imposed by carrier saturation velocity in silicon for the dimensions dictated by the index contrast in an SOI system. In some embodiments, a 40 Gbit/s operation has a 12 dB extinction ratio and 2.25 fJ/micron energy dissipation per bit in a 10 micron-sized device limited only by the photon lifetime of the structure.

Figure 3:
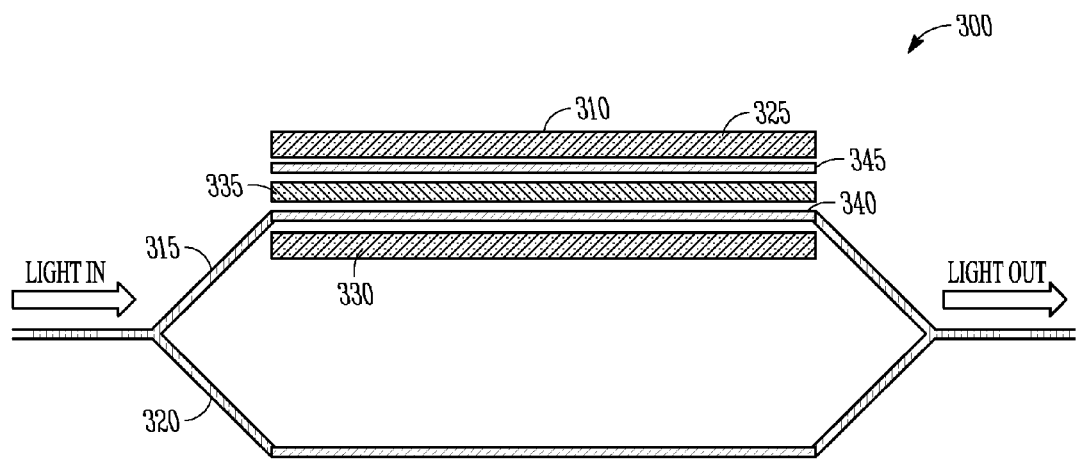
FIG. 3 is a cross section of an alternative modulator according to an example embodiment.
Figure 4:
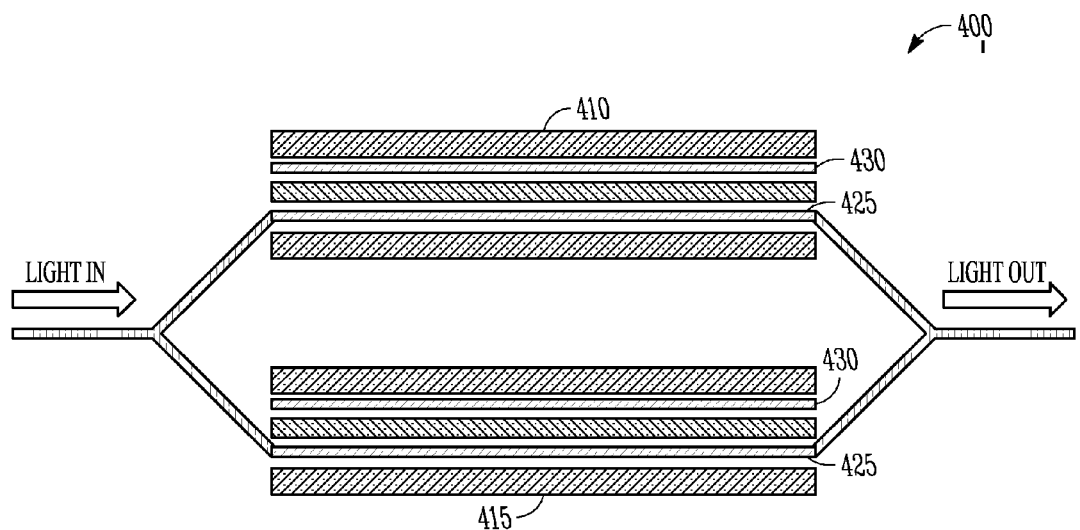
FIG. 4 is a cross section representation of a further alternative modulator according to an example embodiment.

A further embodiment of the modulator is illustrated in FIG. 3 at 300. A Mach-Zehnder interferometer which uses a PINIP structure 310 in one of the arms 315, 320 to create an electro-optic modulator. Structure 310 has P doped regions 325 and 330, and an N doped region 335. Arm 315 extends through the modulator as a waveguide 340, separated from a charge reciprocating structure 345 by N doped region 335. In FIG. 4 at 400, the PINIP structure 410, 415 is shown in both arms. PINIP structure 410 and 415 may have the same structure as structure 310, each including waveguide 425 and charge reciprocating structure 430. The disclosed device uses a charge reciprocating structure (by incorporating a complimentary waveguide-like structure) to allow for control on the amount of injected charge. In general, this feature can be extended to a wide variety of doping profiles/ waveguide geometries. In some embodiment, the charge reciprocating structure or region is a part of the device that has an excess of holes or electrons that can be easily, rapidly, withdrawn for injection into the waveguide. The region also rapidly accepts the holes or electrons that are withdrawn from the waveguide. The close physical proximity of the region provides a way to rapidly inject and extract the charge within short time intervals.

In further embodiments, alternate doping profiles include NIPIN, NPIN, PNIP or any other multilayered doping profile which allows for incorporation of a charge reciprocating structure. The charge reciprocating structure could in general be a rectangular waveguide like feature or any other possible geometry that can be fabricated in a given semiconductor process sequence.

Figure 5:
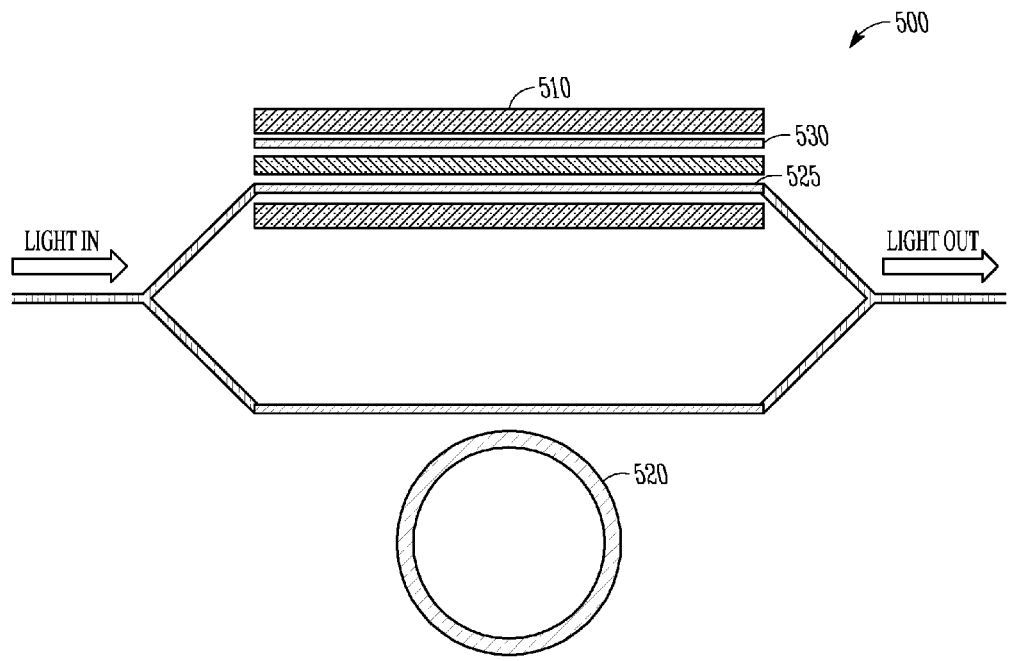
FIG. 5 is a cross section representation of yet a further alternative modulator according to an example embodiment.

FIG. 5 is a cross section representation of a ring assisted Mach-Zehnder configuration at 500. One arm includes a PINIP structure 510. Another arm includes a ring resonator 520, forming a ring assisted Mach-Zehnder interferometer. As in FIG. 3, the structure 510 may have a waveguide 525 and charge reciprocating structure 530.

Figure 6:
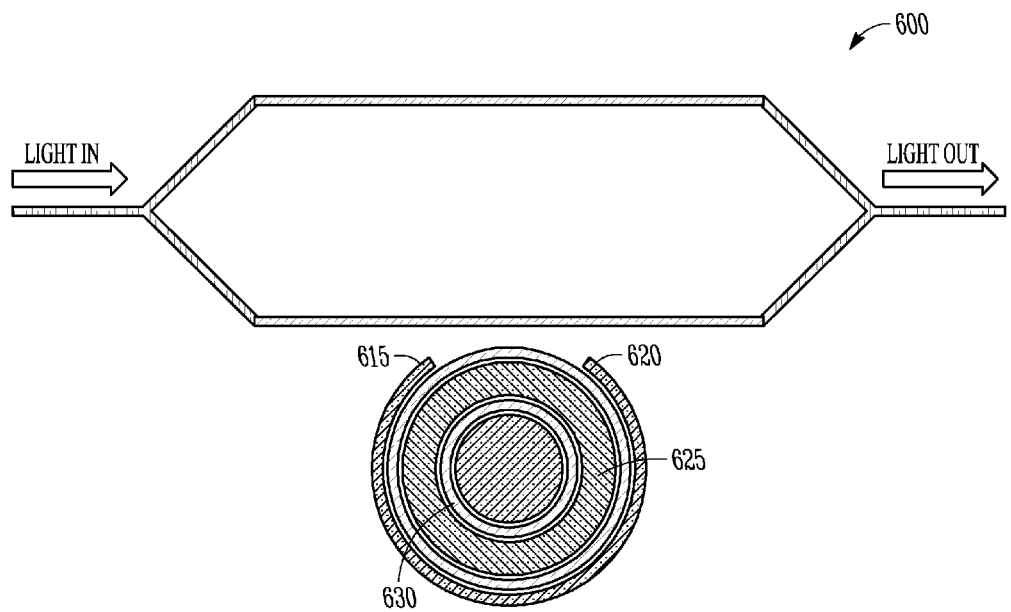
FIG. 6 is a cross section representation of still a further alternative modulator according to an example embodiment.

FIG. 6 is a cross section representation of an alternative ring assisted Mach-Zehnder configuration at 600. In this embodiment, one arm includes a ring based PINIP modulator 610. The PINIP modulator 610 include a waveguide 615, P doped region 620 on the outside of the ring, and N doped region 625 and a charge reciprocating ring 630. It may be similar in design to the modulator shown in FIG. 1B in some embodiments.

In various embodiments, the PINIP electro-optic modulator is a micrometer scale silicon device that can switch light at speeds exceeding 100 billion times per second. It can be manufactured in an industrial silicon CMOS fabrication facility. Carrier injections times of 10 ps and extraction times of 15 ps enable 100 GHz operation. When integrated into a resonator, the micron-size device may operate at 40 Gbits/s with 12 dB extinction ratio and 2.25 fJ/bit/micron-length power dissipation Due to its compact size it can be integrated into silicon microchips enabling data rates exceeding 10 trillion bits per second per interconnect with 100 channels. For telecommunications with 100's of channels, bandwidths approaching 10 trillion bits per second may be achieved on a purely silicon based platform.

The Abstract is provided to comply with 37 C.F.R. §1.72(b) to allow the reader to quickly ascertain the nature and gist of the technical disclosure. The Abstract is submitted with the understanding that it will not be used to limit the scope or meaning of the claims.

The invention claimed is:

1. An electro-optic modulator having successive regions comprising:
   a semiconductor substrate;
   a first P doped region formed on the semiconductor substrate;
   a first intrinsic region formed on the semiconductor substrate and in contact with the first P doped region to form a first P-i interface, the first intrinsic region including a first ridge extending along the first P-i interface to effectuate a waveguide that is parallel to the first P-i interface to guide light inside the waveguide along the first P-i interface;

an N doped region formed on the semiconductor substrate and in contact with the first intrinsic region to form a first i-N interface that is parallel to the first P-i interface;

a second intrinsic region formed on the semiconductor substrate and in contact with the N-doped region to form a second i-N interface parallel to the first i-N interface, the second intrinsic region including a second ridge extending along and being parallel to the second i-N interface; and a second P doped region formed on the semiconductor substrate and in contact with the second intrinsic region to form a second P-i interface that is parallel to the second i-N interface to render the second ridge as a charge reciprocating structure operable to, rapidly, inject charged carriers into, or extract charged carriers from, the waveguide to cause a modulation to a charged carrier density in the waveguide and thus a corresponding optical modulation of guided light in the waveguide when a modulation control signal is applied across a P-i-N-i-P structure that is perpendicular to the waveguide and is collectively formed by successive regions of the first P doped region, the first intrinsic region, the N doped region, the second intrinsic region and the second P doped region.

2. The electro-optic modulator of claim 1 further comprising a ring resonator having a ring waveguide, wherein the ring waveguide includes a ring waveguide section which is the waveguide in the first intrinsic region and the successive regions are disposed transverse to the ring waveguide section.

3. The electro-optic modulator of claim 2 comprising a second optical waveguide that is optically coupled to the ring waveguide to couple light into the ring waveguide that is to be modulated by the P-i-N-i-P structure and to couple light from the ring waveguide that has been modulated by the P-i-N-i-P structure.

4. The electro-optic modulator of claim 2 comprising:
a Mach-Zehnder interferometer which includes a first optical arm and a second optical arm and is structured to cause optical interference between light guided by the first optical arm and light guided by the second optical arm,
wherein the ring waveguide is optically coupled to part of the first optical arm of the Mach-Zehnder interferometer.

5. The electro-optic modulator of claim 1, comprising:
a Mach-Zehnder interferometer formed on the semiconductor substrate to include a first optical arm and a second optical arm and structured to cause optical interference between light guided by the first optical arm and light guided by the second optical arm, wherein the P-i-N-i-P structure is integrated with a section of the first optical arm so that the waveguide in the P-i-N-i-P structure is part of the first optical arm.

6. The electro-optic modulator of claim 5 comprising:
a ring optical resonator optically coupled to part of the second optical arm of the Mach-Zehnder interferometer.

7. The electro-optic modulator of claim 5 comprising:
a second P-i-N-i-P structure that is identical to the P-i-N-i-P structure and is integrated to part of the second optical arm of the Mach-Zehnder interferometer to cause a modulation to a charged carrier density in the second optical arm and thus a corresponding optical modulation of guided light in the second optical arm when a second modulation control signal is applied across the second P-i-N-i-P structure.

8. The electro-optic modulator of claim 1 wherein the doped regions form a PINIP diode structure comprising two adjacent diodes arranged in opposite directions and sharing the N doped region.

9. The electro-optic modulator of claim 8, further comprising a first contact region in contact with the first P doped region and a second contact region in contact with the second P doped region, wherein injected charge is controlled by a signal applied to the first and second contacts across the PINIP diode structure.

10. The electro-optic modulator of claim 9 wherein injected charge modifies a refractive index of the waveguide.

11. The electro-optic modulator of claim 9 wherein the diodes are arranged as a first and second diode, carrier injection stops when a diode goes into reverse bias in response to a positive voltage applied to the first diode.

12. The electro-optic modulator of clam 9 wherein the injected charge is controlled by the amount of charge that can be exchanged between a change in forward and reverse bias of the diodes.

13. The electro-optic modulator of claim 1, wherein:
the optical waveguide is a waveguide ring that encloses a circular region as the first P doped region, and
successive regions outside the waveguide ring are the N doped region, the second intrinsic region and the second P doped region that are ring regions concentric to the circular first P doped region.

14. An electro-optic modulator comprising:
back-to-back diodes formed by laterally doped layers of a PINIP dual diode structure integrated with a photonic device comprising an optical waveguide that extends along a waveguide direction perpendicular to the PINIP dual diode structure and includes an optical waveguide section located at and integrated in one diode of the PINIP dual diode structure,
wherein the other diode of the PINIP dual diode structure forms a charge reciprocating structure operable to, rapidly, inject charged carriers into, or extract charged carriers from, the optical waveguide sectoin to cause a modulation to a charged carrier density in the optical waveguide section and thus a corresponding optical modulation of guided light in the optical waveguide when a modulation control signal is applied across the PINIP dual diode structure.

15. The electro-optic modulator of claim 14 wherein the photonic device includes a second optical waveguide that is optically coupled to the optical waveguide.

16. The electro-optic modulator of claim 15 wherein the optical waveguide is a microring resonator waveguide formed in an intrinsic region of the PINIP dual diode structure.

17. The electro-optic modulator of claim 15 wherein the optical waveguide and the second optical waveguide are coupled to one another to form a Mach-Zehnder interferometer.

18. The electro-optic modulator of claim 14 wherein the optical waveguide is a ring optical waveguide.

19. A method for modulating light, comprising:
directing light into an optical waveguide which includes an optical waveguide section that is part of an intrinsic region of a first diode structure of a dual diode structure formed by the first diode structure and a second adjacent diode structure that shares a common doped region with the first diode structure and is in an opposite diode direction with respect to the first diode structure, wherein the optical waveguide extends along a waveguide direction that is perpendicular to a diode direction of the first diode structure; and applying a control signal across the dual diode structure to operate an intrinsic region of the second diode structure as a charge reciprocating structure to, rapidly, inject charged carriers into, or extract charged carriers from, the optical waveguide section in the first diode structure to cause a modulation to a charged carrier density in the optical waveguide section and thus a corresponding optical modulation of guided light in the optical waveguide section.

20. The method as in claim 19, comprising:

setting a frequency of the control signal in modulating the charged carrier density in the optical waveguide section to be 100 GHz.

21. The method as in claim 19, wherein:

the optical waveguide is an optical ring waveguide.

22. The method as in claim 19, wherein:

the optical waveguide is one of two optical arms in a Mach-Zehnder interferometer.

\* \* \* \* \*